US008862153B1

(12) United States Patent
Iwaszko et al.

(10) Patent No.: US 8,862,153 B1
(45) Date of Patent: Oct. 14, 2014

(54) AUTOMATED PORTABLE CALL COLLECTION UNIT

(75) Inventors: Robert M. Iwaszko, Williamsburg, VA (US); Jeff Torres, Boonton, NJ (US); Todd Covington, Fort Worth, TX (US)

(73) Assignee: Cellco Partnership, Basking Ridge, NJ (US)

(*) Notice: Subject to any disclaimer, the term of this patent is extended or adjusted under 35 U.S.C. 154(b) by 304 days.

(21) Appl. No.: 13/114,905

(22) Filed: May 24, 2011

(51) Int. Cl.
*H04W 24/00* (2009.01)

(52) U.S. Cl.
USPC ............ 455/456.2; 455/115.2; 455/430; 455/440; 455/456.1; 455/457; 713/400; 713/401; 713/500; 713/600; 701/468; 701/469; 701/473; 701/483; 701/485

(58) Field of Classification Search
USPC ........ 455/115.2, 430, 440, 456.1–456.3, 457; 701/468–476, 478, 482–485; 713/400, 713/401, 500, 600
See application file for complete search history.

(56) References Cited

U.S. PATENT DOCUMENTS

| | | | |
|---|---|---|---|
| 5,751,245 A * | 5/1998 | Janky et al. | 342/357.4 |
| 5,889,474 A * | 3/1999 | LaDue | 340/8.1 |
| 7,529,236 B2 | 5/2009 | Kota et al. | |
| 2002/0009974 A1 * | 1/2002 | Kuwahara et al. | 455/67.6 |
| 2007/0123248 A1 * | 5/2007 | Krasner et al. | 455/422.1 |
| 2007/0182625 A1 * | 8/2007 | Kerai et al. | 342/357.1 |
| 2008/0298380 A1 * | 12/2008 | Rittmeyer et al. | 370/412 |
| 2009/0305722 A1 * | 12/2009 | Tiedeman et al. | 455/456.1 |
| 2009/0310570 A1 * | 12/2009 | Smith | 370/335 |
| 2010/0041416 A1 * | 2/2010 | Manzen | 455/456.1 |

OTHER PUBLICATIONS

LocationAssurance Manager, TechnoCom. <www.technocom-wireless.com> © 2007.

* cited by examiner

*Primary Examiner* — Dai A Phuong (57) ABSTRACT

An automated portable call collection unit (APCCU) may gather information used in testing the accuracy of a wireless mobile device locating system. A GPS ground truth detector may detect the location of the APCCU based on GPS signals. A cellular GPS detector may detect GPS signals identified by a signal-identification communication from the locating system. An internal clock may keep time and synchronize its time to GPS time as announced periodically by GPS time signals. A controller may repeatedly cause a cellular network communication system to wirelessly request and receive the signal-identification communication and to send the information about the detected GPS signals, the locations, and the times. All of this may be done in a manner that insures that the accuracy of the locating system is not tested before the internal clock is first synchronized to GPS time following application of operating power to the APCCU.

19 Claims, 4 Drawing Sheets

AUTOMATED PORTABLE CALL COLLECTION UNIT

BACKGROUND

1. Technical Field

This disclosure relates to wireless mobile device locating systems and to portable call collection units that test the accuracy of such locating systems.

2. Description of Related Art

FCC regulations require wireless mobile communication device carriers to quickly and automatically determine the location of cellphones when they place enhanced 911 calls and to provide this location information to public safety answering points (PSAPS).

Carriers have built and installed wireless mobile device locating systems that determine and provide this location information. The accuracy of these systems must be tested, and the results of these tests must be provided to the FCC.

To perform these tests, call collection units are installed in test vehicles and the test vehicles are driven within a service area. However, a service area may be so large as to make it impractical for the entire area to be tested with just a few test vehicles, particularly when re-testing is needed due to system repairs and upgrades.

To help with this problem, call collection units can be made portable so that they can be moved from one vehicle to another. However, making the units portable can give rise to another problem: When power to the portable unit is removed, synchronization between an internal time clock in the call collection unit and time signals that are periodically transmitted as part of the GPS signals can be lost. This can cause the tests results to be inaccurate.

SUMMARY

An automated portable call collection unit may gather information used in testing the accuracy of a wireless mobile device locating system. A GPS ground truth detector may detect the location of the automated portable call collection unit based on GPS signals. A cellular GPS detector may detect GPS signals identified by a signal-identification communication from the wireless mobile device locating system. An internal clock may keep time and synchronize its time to GPS time as announced periodically by GPS time signals. A cellular network communication system may wirelessly request and receive the signal-identification communication from the wireless mobile device locating system over a cellular communication network. The cellular network communication system may also wirelessly send information to the wireless mobile device locating system over the cellular communication network about one or more locations detected by the GPS ground truth detector, about the GPS signals that are detected by the cellular GPS detector, and about one or more of the times on the internal clock. A controller may repeatedly cause the cellular network communication system to wirelessly request and receive the signal-identification communication and to send the information about the GPS signals, the locations, and the times. All of this may be done in a manner that insures that the accuracy of the wireless mobile device locating system is not tested before the internal clock is first synchronized to GPS time following application of operating power to the automated portable call collection unit.

The manner that insures that location accuracy is not tested too soon may include not requesting the signal-identification communication until after the internal clock is first synchronized to GPS time following application of operating power to the automated portable call collection unit, not sending the information about the locations, the GPS signals, or the times until after the internal clock is first synchronized to GPS time following application of operating power to the automated portable call collection unit, sending information to the wireless device locating system indicative of when the internal clock is first synchronized to GPS time following application of operating power to the automated portable call collection unit, and/or sending information indicative of which of the locations, GPS signals, and/or times were detected after the internal clock is first synchronized to GPS time following application of operating power to the automated portable call collection unit.

The controller may determine when the internal clock is first synchronized to GPS time following application of operating power to the automated portable call collection unit by equating this first synchronization with a pre-determined amount of time following application of operating power to the automated portable call collection unit. The pre-determined time may be at least ten or fifteen minutes or at least the time it takes the GPS ground truth detector to acquire the GPS signals plus the time between successive GPS time signals.

The controller may periodically cause the cellular network communication system to wirelessly request and receive the signal-identification communication and to send the information about the GPS signals, the locations, and the times.

The GPS ground truth detector may detect the locations on a periodic basis. The periodic basis may be at least once every second.

The information that is sent to the wireless mobile device locating system may include information about several locations that were detected by the GPS ground truth detector and the times on the internal clock when each was detected.

An automated portable call collection system may include an automated portable call collection unit for gathering information used in testing the accuracy of a wireless mobile device locating system, a power connector on the automated portable call collection unit configured to receive operating power for the automated portable call collection unit, a vehicle cable configured at one end to plug into the power connector and at the other end to plug into a receptacle in a vehicle so as to draw operating power for the automated portable call collection unit from the vehicle, a battery configured to provide operating power for the automated portable call collection unit, a battery cable configured at one end to plug into the power connector and at the other end to connect to the battery so as to draw operating power for the automated portable call collection unit from the battery, and a shock-resistant case with protective padding configured to house the automated portable call collection unit, the cigarette lighter cable, the battery, and the battery cable in a manner that protects each one of them against damage from shock during transport.

The automated portable call collection unit may include a GPS ground truth antenna configured to receive the GPS signals, a cellular GPS antenna configured to receive the GPS signals, and/or a cellular communication antenna configured to send and receive the cellular communication signals. The shock-resistant case may house one or more of these antennas in a manner that protect them against damage from shock during transport.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
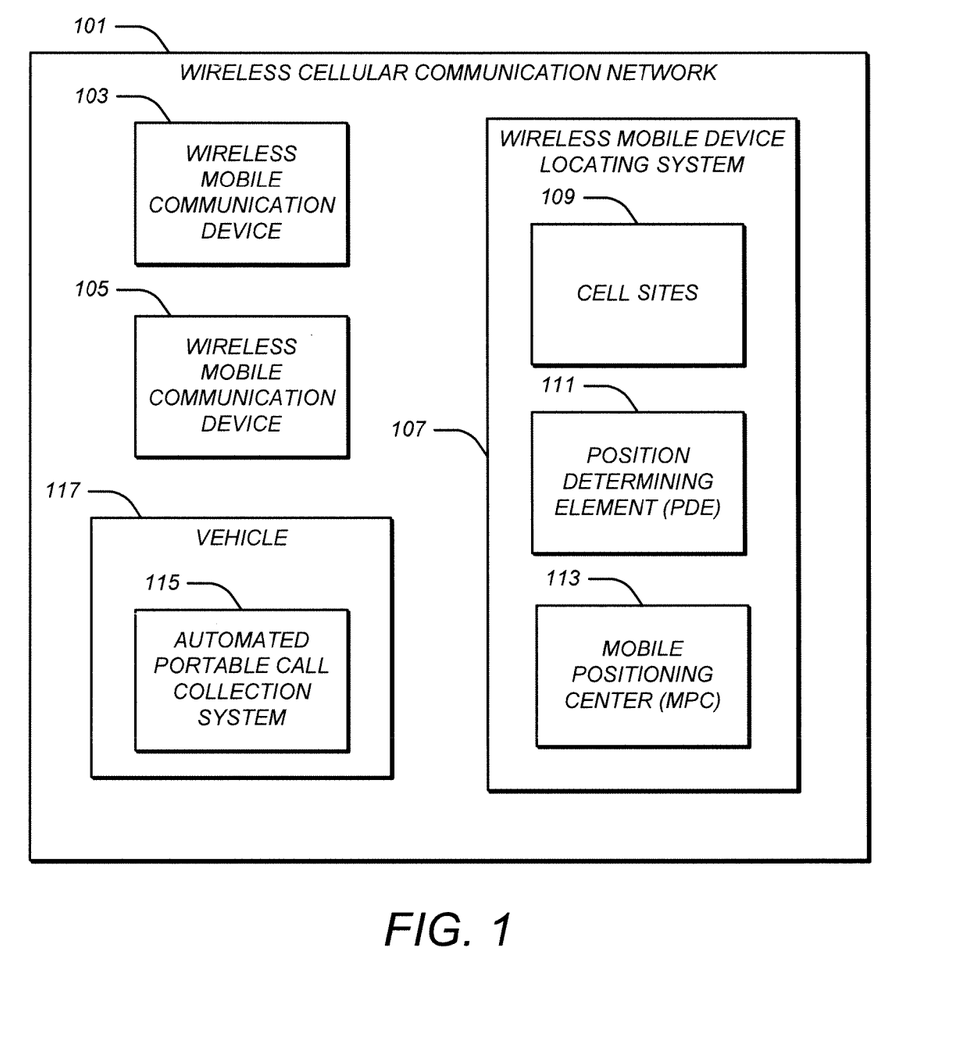
FIG. 1 illustrates selected components within a wireless cellular communication network, including wireless mobile communication devices, a vehicle containing an automated portable call collection system, and a wireless mobile device locating system.

FIG. 1 illustrates selected components within a wireless cellular communication network, including wireless mobile communication devices, a vehicle containing an automated portable call collection system, and a wireless mobile device locating system.

As illustrated in FIG. 1, a wireless cellular communication network 101 includes various wireless mobile communication devices, such as a wireless mobile communication device 103 and a wireless mobile communication device 105.

The wireless mobile communication devices may be of any type. For example, they may be cellphones, smartphones, PDAs, a laptops, or tablets.

Each wireless mobile communication device may be configured to communicate with other wireless mobile communication devices within the wireless cellular communication network 101, as well as with devices and systems outside of the wireless cellular communication network 101.

The wireless cellular communication network 101 contains a wireless mobile device locating system 107. The wireless mobile device locating system 107 is configured to determine the location of each wireless mobile communication device when that device initiates an enhanced 911 (e911) call. The wireless mobile device locating system 107 includes cell sites 109, one or more of which communicate with each wireless mobile communication device.

The wireless mobile device locating system 107 also includes one or more petition determining elements (PDEs), such as a position determining element (PDE) 111. Each position determining element is configured to determine the position of a wireless mobile communication device when it initiates an enhanced 911 call. The position determining element 111 is configured to determine this position based on information it receives from the cell sites that are in communication with the wireless mobile communication device, as well as information from the wireless mobile communication device.

More specifically, the identity of the cell sites that are in communication with the wireless mobile communication device are provided to the position determining element 111. Based on their known location, the position determining element 111 identifies GPS satellite signals that a cellular GPS detector within the wireless mobile communication device should detect. The identity of these GPS signals is delivered to the wireless mobile communication device. In turn, the wireless mobile communication device detects information about these identified GPS signals and returns this information to the position determining element. The position of the wireless mobile communication device is then determined by the position determining element 111 based on this information.

The wireless mobile device locating system 107 includes one or more mobile positioning centers (MPCs), such as a mobile positioning center 113. Each mobile positioning center is configured to receive information about the position of the wireless mobile communication device from the position determining element 111. The mobile positioning center 113 receives signaling instructions from the wireless cellular communication network when a wireless mobile communication device has initiated an emergency e911 call. The mobile positioning center has knowledge of the wireless cellular communication network and correlates the signaling information from the wireless mobile communicating device, the wireless cellular network information, and a public safety answering point (PSAP) associated with that location. This correlated information is used to signal to the position determining element 111 to begin wireless location acquisition between the position determining element 111 and the wireless mobile communication device.

The accuracy of the location determinations made by the wireless mobile device locating system 107 may be compared with the location information from the automated portable call collection system 115 and the information from the position determination element 113. The automated portable call collection system 115 may be placed within a vehicle 117 that is driven in various areas serviced by the wireless cellular communication network 101. The automated portable call collection system 115 may instead be used without a vehicle, e.g., while on foot.

Figure 2:
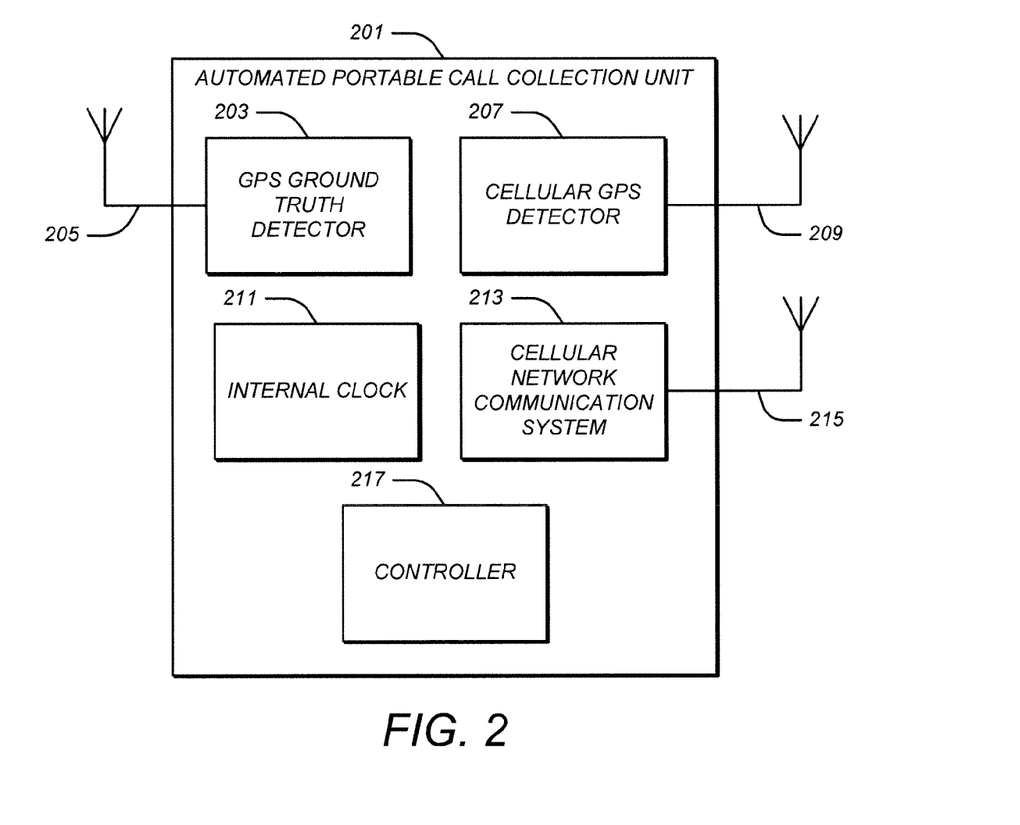
FIG. 2 illustrates an example of an automated portable call collection unit that may be part of the automated portable call collection system illustrated in FIG. 1.

FIG. 2 illustrates an example of an automated portable call collection unit that may be part of the automated portable call collection system illustrated in FIG. 1. As illustrated in FIG. 2, the automated portable call collection unit 201 includes a GPS ground truth detector 203, a cellular GPS detector 207, an internal clock 211, a cellular network communication system 213, and a controller 217. A cellular communication antenna 215, a GPS ground truth antenna 205, and GPS cellular antenna 209 are also part of the automated portable call collection system and are positioned outside of the unit and connected to it. When the automated portable call collection unit 201 is positioned within the vehicle 117, the antennas 205, 209, and 215 may be positioned on or within the vehicle in a fashion that permits them to transmit and/or receive the signals that are described herein. One or more of the antennas may instead be positioned within the automated portable call collection unit 201.

The GPS ground truth detector 203 is configured to detect the location of the automated portable call collection unit 201 based on GPS signals received by the GPS ground truth antenna 205. The GPS ground truth detector 203 may be configured to detect this location on a periodic basis, such as at least every 1, 10 or 30 seconds. These detected locations are stored within the unit, such as within a table in a data storage memory.

The internal clock 211 is configured to keep time and to synchronize this time with GPS time as announced periodically (e.g., every 10 or 12 minutes) within GPS signals that are received by the GPS ground truth antenna 205 and/or the GPS cellular antenna 209. The internal clock 211 may or may not be configured to keep internal time after power is removed from the automated portable call collection unit 201. When it is configured to keep internal time, the internal clock 211 may include a small internal battery which is sufficient to keep the internal clock 211 running without external power to the system.

The cellular network communication system 213 is configured to wirelessly transmit a request over the cellular telecommunication antenna 215 to the position determining element 111 for the identification of GPS signals that the cellular GPS detector 207 should detect. The cellular network communication system 213 may follow the same process for requesting these GPS identification signal as do the wireless mobile communication devices when they place an enhanced 911 call for assistance. In a different embodiment, the cellular network communication system 213 may be instead configured to dial a mobile device number (MDN) that is dedicated to location testing, rather than the emergency number 911.

The wireless mobile device locating system 107 is configured to receive this request and deliver it to the position determining element 111. In turn, the position determining element 111 is configured to send back a signal-identification communication that identifies GPS signals to be detected by the cellular GPS detector 207. The position determining element 111 identifies these signals by determining which cell sites are in communication with the cellular network communication system 213 and by then consulting the table of the GPS signals that should be detected in the area of these cell sites.

The signal-identification communication from the position determining element 111 is returned to the cellular communication antenna 215 and received by the cellular network communication system 213. The identity of the desired GPS signals is delivered to the cellular GPS detector 207. The cellular GPS detector 207 is configured to detect information about these identified GPS signals as they are received by the cellular GPS antenna 209. This can be the same process that corresponding cellular GPS detectors in the wireless mobile communication devices follow.

The information about the identified GPS signals that is detected, for example, will typically include pseudo-range measurement information. The information within a pseudo-range measurement is the distance measurements based on the correlation of a satellite's transmitted code (may be the C/A-Code or the encrypted P-Code) and the local receiver's reference code (for that PRN satellite number), that has not been corrected for errors in synchronization between the GPS transmitter's clock and the cellular GPS detector's clock. Hence a pseudo-range measurement is a time-error biased distance measurement.

The detected information about these identified GPS signals is returned by the cellular GPS detector 207 to the cellular network communication system 213 and, in turn, delivered back to the position determining element 111 by the cellular communication antenna 215. The position determining element 111 then determines the position of the automated portable call collection unit 201 based on this information about the identified GPS signals and the location of the cell sites that are in communication with the automated portable call collection unit 201. The position determining element 111 may follow the same process in determining this location as it follows in determining the location of wireless mobile communication devices that have placed an enhanced 911 call.

Shortly before, contemporaneous with, or after the delivery of this information about the identified GPS signals, the cellular network communication system 213 also receives information that has been stored about the location of the automated portable call collection unit 201 as independently determined by the GPS ground truth detector 203, along with the time on the internal clock 211 at which each location was determined by GPS ground truth detector 203. The wireless mobile device locating system 107 compares the location that has been determined by position determining element 111 and the automated portable call collection unit 201 with the location that the GPS ground truth detector 203 determined at approximately same time. Any deviation is reported by the position determining element 111 as an error in its determination.

The controller 217 is configured to repeatedly cause the cellular network communication system 213 to wirelessly request and receive the signal-identification communication from the position determining element 111. In response to each communication, the controller 217 is configured to cause the cellular network communication system 213 to return the information about the identified GPS signals that is detected by the cellular GPS detector 207 to the position determining element 111. Also in response to each signal-identified communication, the controller 217 is configured to cause the cellular network communication system 213 to return a contemporaneous set of the locations that are determined by GPS ground truth detector 203 to the position determining element 111, along with the time on the internal clock 211 when each of these determinations were made, again to the position determining element 111.

The position determining element 111 also has an internal clock which is synchronized to the GPS time signals. If the automated portable call collection unit 201 has just recently been powered on, however, its internal clock 211 may not be synchronized with the GPS time signals. As a consequence, the location that was determined by the GPS ground truth detector 203 that is marked with approximately the same time as the location that the position determining element 111 determined may, in fact, not be the same location because of errors in the time stamp that is placed on the location that is determined by the GPS ground truth detector 203. This can lead to errors in the calculated accuracy of the position determination that is made by the position determining element 111.

The controller 217 is configured to minimize such errors. Specifically, the controller 217 is configured to insure that the accuracy of the wireless mobile device locating system is not tested before the internal clock is first synchronized to GPS time following application of operating power to the automated portable call collection unit. For example, the controller 217 is configured to cause the cellular network communication system 213 not to request the signal-identification communication from the position determining element 111 until after GPS signals have been acquired by the automated portable call collection unit 201 following the application of operative power at a time and until the first GPS time signal is thereafter received.

Figure 3:
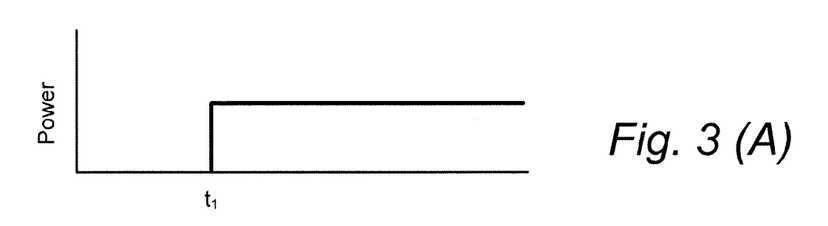
FIG. 3(A)-3(D) illustrate examples of signals that may be present in the automated portable call collection unit illustrated in FIG. 2.

FIG. 3(A)-3(D) illustrate examples of signals that may be present in the automated portable call collection unit illustrated in FIG. 2. FIG. 3(A) illustrates the application of operating power to the automated portable call collection unit 201 at a time $t_1$. FIG. 3(B) illustrates the acquisition of GPS signals by the automated portable call collection unit 201 following the application of operative power at a time $t_2$. FIG. 3(C) illustrates the receipt of the first GPS time signal after application of operating power and after GPS signal acquisition at a time $t_3$. Finally, FIG. 3(D) illustrates deferral of the initiation of periodic signal ID communication request by the cellular network communication system 213 until a time $t_3$. This insures that no signal ID communication request is delivered to the position determining element 111 until after the internal clock 211 has re-synchronized with the GPS time signals.

Not requesting a signal-identification communication until after the internal clock is first synchronized to GPS time following application of power to the automated portable call collection unit 201 is only one approach that insures that the accuracy of the wireless mobile device locating system is not tested before the internal clock is first synchronized to GPS time following application of operative power to the automated portable call collection unit 201. Other approaches may be used instead. For example, instead of deferring the initiation of signal ID communication request, the controller may instead be configured to defer delivery of information about the locations from the GPS ground truth detector 203, information about the GPS signals from the cellular GPS detector 207, and/or the recorded internal clock times from the internal clock 211, all until after the internal clock is first synchronized to GPS time following application of operating power to the automated portable call collection unit 201.

The controller 217 may instead be configured not to defer the delivery of any of these signals, but to instead provide an additional signal to the position determining element 111 when the internal clock is first synchronized to GPS time following application of operating power to the automated portable call collection unit 201. The position determining element 111 may correspondingly be configured not to evaluate the accuracy of its position determination until after receipt of this synchronization signal.

A still further approach is for the controller 217 to be configured to indicate by a flag or other type of indicator whether reported information was gathered before or after the reestablishment of synchronization, such as reported information from the GPS ground truth detector 203, the internal clock 211, and/or the cellular GPS detector 207.

The controller 217 may employ any means for determining when the internal clock 211 is re-synchronized to the GPS time signals following application of operating power and the reacquisition of the GPS signal, i.e., when the time $t_3$ as illustrated in FIG. 3(c) occurs. For example, the controller 217 may be configured to receive a signal from the internal clock 211 as to when this time occurs. The controller 217 may instead be configured to simply wait for a pre-determined amount of time following the application of operating power and/or following the reacquisition of the GPS signals. The pre-determined amount of time may be a "worst case" amount, i.e., an amount which ensures that the reacquisition of the GPS signals and the subsequent receipt of the next time signal will have taken place. For example, the pre-determined time may be at least ten, fifteen, or twenty minutes.

The controller 217 may be configured to provide a signal to the user of the automated portable call collection unit 201 informing the user when the unit is in condition for participating in location accuracy testing, thereby ensuring that the user does not drive the vehicle 117 erroneously thinking that such tests are taking place prior to this time.

Figure 4:
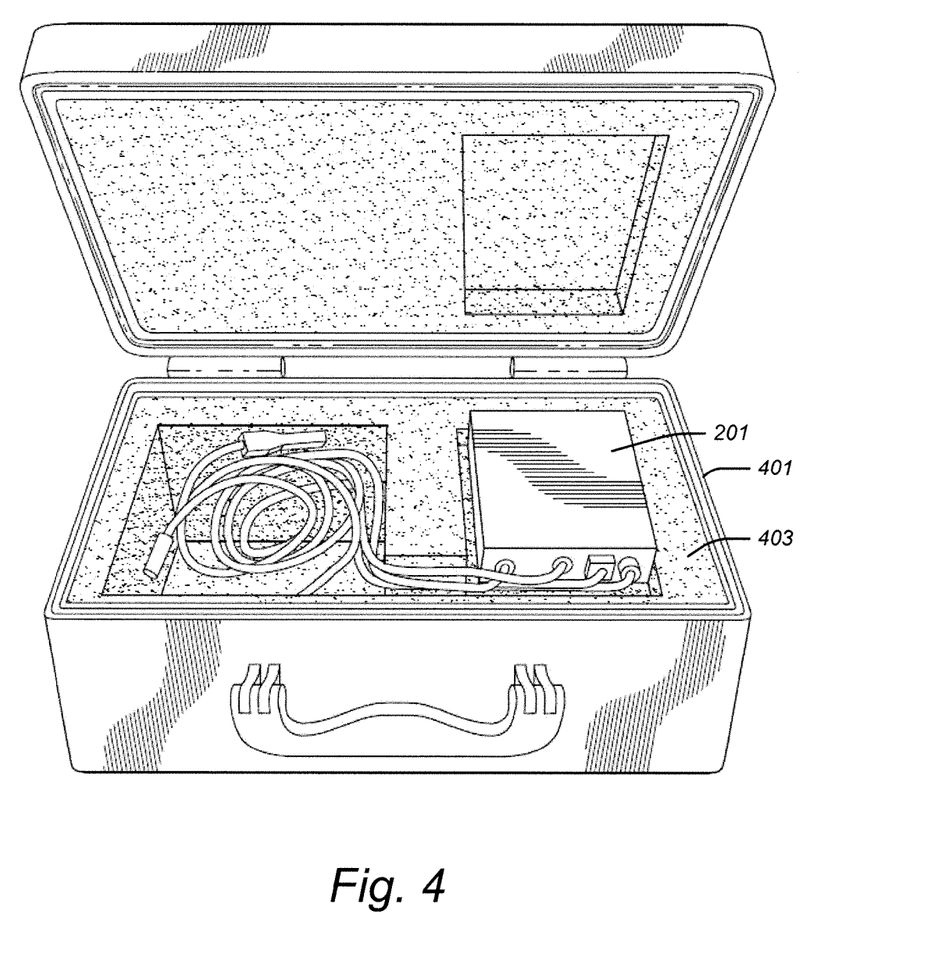
FIG. 4 illustrates an example of components in an automated portable call collection system stored within an example of a carrying case.

FIG. 4 illustrates an example of components in an automated portable call collection system stored within an example of a carrying case. As illustrate in FIG. 4, a carrying case 401 various components in the automated portable call collection system 115 when not in use, such as the automated portable call collection unit 201 and the antennas 205, 209, and 215. The carrying case carries a vehicle cable configured at one end to plug into a power connector on the automated portable call collection unit 201 and at the other end to plug into a receptacle in a vehicle so as to draw operating power for the automated portable call collection unit 201 from the vehicle, such as a cigarette lighter or accessory socket. The carrying case 401 may also be configured to carry a battery (not shown in) that provides operating power to the automated portable call collection unit 201, along with a battery cable configured at one end to plug into the power connector and at the other end to connect to the battery, so as to draw operating power for the automated portable call collection unit 201 from the battery.

The carrying case 401 is shock-resistant, FEMA 1 certified, durable, watertight, and airtight. It is provided with protective padding 403 configured to surround and protect each of the components that are placed within the carrying case 401 against damage from shock during transport.

The automated portable call collection unit 201 is configured with appropriate electronic components arranged to perform each of the functions that have been described herein, including the functions of the GPS ground truth detector 203, the cellular GPS detector 207, the internal clock 211, the cellular network communication system 213, and the controller 217.

One or more of these components may include computer software, including one or more operating systems, device drivers, application programs, and/or communication programs. When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents.

The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The invention claimed is:

1. An automated portable call collection unit for gathering information used in testing the accuracy of a wireless mobile device locating system, the automated portable call collection unit comprising:
   a GPS ground truth detector configured to detect a location of the automated portable call collection unit based on GPS signals;
   a cellular GPS detector configured to detect GPS signals identified by a signal-identification communication from the wireless mobile device locating system;
   an internal clock configured to keep time and to synchronize its time to GPS time as announced periodically by GPS time signals;
   a cellular network communication system configured to:
      wirelessly request and receive the signal-identification communication from the wireless mobile device locating system over a cellular communication network;
      wirelessly send information to the wireless mobile device locating system over the cellular communication network about:
         one or more locations detected by the GPS ground truth detector;
         the GPS signals that are detected by the cellular GPS detector; and
         one or more of the times on the internal clock; and
   a controller configured to repeatedly cause the cellular network communication system to wirelessly request and receive the signal-identification communication and to send the information about the GPS signals, the locations, and the times, all in a manner that insures that the accuracy of the wireless mobile device locating system is not tested before the internal clock is first synchronized to GPS time following application of operating power to the automated portable call collection unit.

2. The automated portable call collection unit of claim 1 wherein the manner that insures the accuracy of the tests includes not requesting the signal-identification communication until after the internal clock is first synchronized to GPS time following application of operating power to the automated portable call collection unit.

3. The automated portable call collection unit of claim 1 wherein the manner that insures the accuracy of the tests includes not sending the information about the locations, the GPS signals, or the times until after the internal clock is first synchronized to GPS time following application of operating power to the automated portable call collection unit.

4. The automated portable call collection unit of claim 1 wherein the manner that insures the accuracy of the tests includes sending information to the wireless device locating system indicative of when the internal clock is first synchronized to GPS time following application of operating power to the automated portable call collection unit.

5. The automated portable call collection unit of claim 1 wherein the manner that insures the accuracy of the tests includes sending information indicative of which of the locations, GPS signals, and/or times were detected after the internal clock is first synchronized to GPS time following application of operating power to the automated portable call collection unit.

6. The automated portable call collection unit of claim 1 wherein the controller is configured to determine when the internal clock is first synchronized to GPS time following application of operating power to the automated portable call collection unit by equating this first synchronization with a pre-determined amount of time following application of operating power to the automated portable call collection unit.

7. The automated portable call collection unit of claim 6 wherein the pre-determined time is at least ten minutes.

8. The automated portable call collection unit of claim 7 wherein the pre-determined time is at least fifteen minutes.

9. The automated portable call collection unit of claim 6 wherein the pre-determined period of time is at least the time it takes the GPS ground truth detector to acquire the GPS signals.

10. The automated portable call collection unit of claim 6 wherein the pre-determined period of time is at least the time between successive GPS time signals.

11. The automated portable call collection unit of claim 6 wherein the pre-determined period of time is at least the time it takes the GPS ground truth detector to acquire the GPS signals plus the time between successive GPS time signals.

12. The automated portable call collection unit of claim 1 wherein the controller is configured to periodically cause the cellular network communication system to wirelessly request and receive the signal-identification communication and to send the information about the GPS signals, the locations, and the times.

13. The automated portable call collection unit of claim 1 wherein the GPS ground truth detector is configured to detect the locations on a periodic basis.

14. The automated portable call collection unit of claim 13 wherein the periodic basis is at least once every second.

15. The automated portable call collection unit of claim 13 wherein the information that is sent to the wireless mobile device locating system includes information about several locations that were detected by the GPS ground truth detector and the times on the internal clock when each was detected.

16. An automated portable call collection system comprising:
   an automated portable call collection unit for gathering information used in testing the accuracy of a wireless mobile device locating system;
   a power connector on the automated portable call collection unit configured to receive operating power for the automated portable call collection unit;
   a vehicle cable configured at one end to plug into the power connector and at the other end to plug into a receptacle in a vehicle so as to draw operating power for the automated portable call collection unit from the vehicle;
   a battery configured to provide operating power for the automated portable call collection unit;

a battery cable configured at one end to plug into the power connector and at the other end to connect to the battery so as to draw operating power for the automated portable call collection unit from the battery; and a shock-resistant case with protective padding configured to house the automated portable call collection unit, the cigarette lighter cable, the battery, and the battery cable in a manner that protects each one of them against damage from shock during transport of the case, wherein the automated portable call collection unit comprises:

a GPS ground truth detector configured to detect a location of the automated portable call collection unit based on GPS signals;

a cellular GPS detector configured to detect GPS signals identified by a signal-identification communication from the wireless mobile device locating system;

an internal clock configured to keep time and to synchronize its time to GPS time as announced periodically by GPS time signals;

a cellular network communication system configured to:
  wirelessly request and receive the signal-identification communication from the wireless mobile device locating system over a cellular communication network;
  wirelessly send information to the wireless mobile device locating system over the cellular communication network about:
    one or more locations detected by the GPS ground truth detector;
    the GPS signals that are detected by the cellular GPS detector; and
    one or more of the times on the internal clock; and a controller configured to repeatedly cause the cellular network communication system to wirelessly request and receive the signal-identification communication and to send the information about the GPS signals, the locations, and the times, all in a manner that insures that the accuracy of the wireless mobile device locating system is not tested before the internal clock is first synchronized to GPS time following application of operating power to the automated portable call collection unit.

17. The automated portable call collection system of claim 16, further comprising:
  a GPS ground truth antenna configured to receive the GPS signals;
  wherein the shock-resistant case is configured to house the GPS ground truth antenna in a manner that protects it against damage from shock during transport of the case.

18. The automated portable call collection system of claim 16, further comprising:
  a cellular GPS antenna configured to receive the GPS signals;
  wherein the shock-resistant case is configured to house the cellular GPS antenna in a manner that protects it against damage from shock during transport of the case.

19. The automated portable call collection system of claim 16, further comprising:
  a cellular communication antenna configured to send and receive the cellular communication signals;
  wherein the shock-resistant case is configured to house the cellular communication antenna in a manner that protects it against damage from shock during transport of the case.

* * * * *